(12) United States Patent
Williams et al.

(10) Patent No.: US 9,835,490 B2
(45) Date of Patent: Dec. 5, 2017

(54) DISCRIMINATING PHOTO COUNTS AND DARK COUNTS IN AN AVALANCHE PHOTODIODE

(71) Applicant: Voxtel, Inc., Beaverton, OR (US)

(72) Inventors: George Williams, Portland, OR (US); Andrew Huntington, Aloha, OR (US)

(73) Assignee: Voxtel, Inc., Beaverton, OR (US)

( * ) Notice: Subject to any disclaimer, the term of this patent is extended or adjusted under 35 U.S.C. 154(b) by 307 days.

(21) Appl. No.: 14/812,847

(22) Filed: Jul. 29, 2015

(65) Prior Publication Data

US 2015/0338270 A1 Nov. 26, 2015

Related U.S. Application Data

(63) Continuation-in-part of application No. 13/891,829, filed on May 10, 2013, now Pat. No. 9,121,762.

(60) Provisional application No. 61/645,159, filed on May 10, 2012.

(51) Int. Cl.
  *G01J 1/44* (2006.01)
  *G01J 1/18* (2006.01)

(52) U.S. Cl.
  CPC .. *G01J 1/18* (2013.01); *G01J 1/44* (2013.01)

(58) Field of Classification Search
  CPC .......................... H01L 31/107; H01L 29/66113
  USPC .......................................... 250/206.1, 214 R
  See application file for complete search history.

*Primary Examiner* — Renee Chavez

(57) ABSTRACT

The output of an avalanche photodiode (APD) comprises a "photocurrent" component comprising photon initiated events resulting from the interaction of photons with the APD and a "dark current" component comprising dark carrier events arising in the APD even when the APD is not exposed to light. Differences in the pulse height distributions of photon initiated events and dark carrier initiated events are used to statistically discriminate between photocurrent and dark current components of APD output.

22 Claims, 10 Drawing Sheets

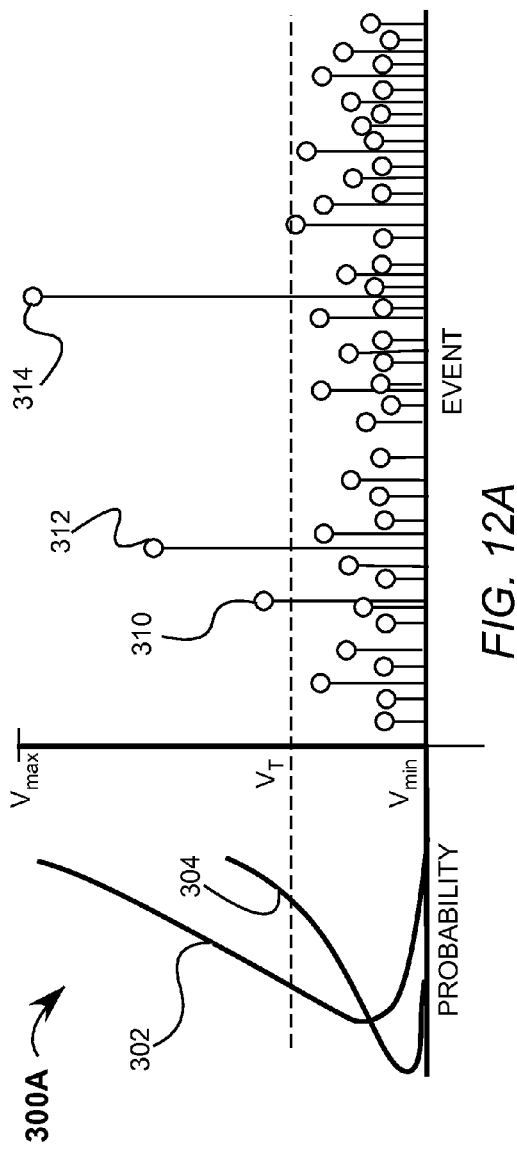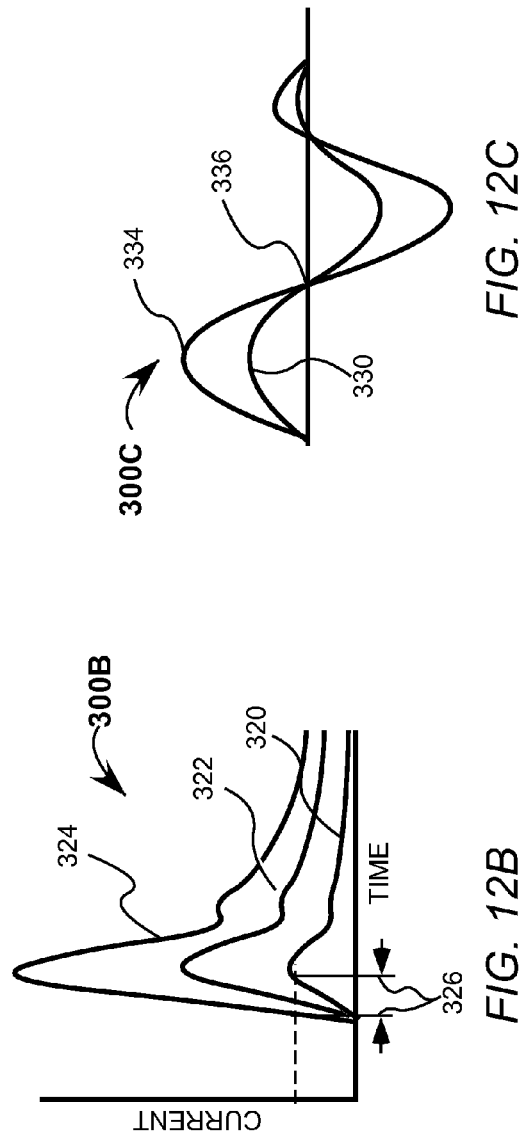
FIG. 12A
FIG. 12B
FIG. 12C

DISCRIMINATING PHOTO COUNTS AND DARK COUNTS IN AN AVALANCHE PHOTODIODE

CROSS-REFERENCE TO RELATED APPLICATIONS

This application claims the benefit of U.S. patent application Ser. No. 13/891,829, filed on May 10, 2013, which claims benefit to U.S. Provisional Application No. 61/645,159, filed May 10, 2012 both of which hereby incorporated by reference in their entirety.

BACKGROUND OF THE INVENTION

The present invention relates to a photoreceiver and, more particularly, to a method and apparatus for discriminating between photon initiated signals and dark signals arising in the absence of interaction with a photon in an avalanche photodiode of a photoreceiver.

A photodiode is a semiconductor device which absorbs and transforms light into an electric current. Detection of an electrical event, an electrical pulse or electric current, at the output of the photodiode evidences the interaction of light with the photodiode. The electrical current generated by the absorption of light in the photodiode is called "photocurrent" and the ratio of the magnitude of the photocurrent, in amperes, to the incident luminous power, in watts, is the photodiode's "responsivity." Amplification electronic circuits are often used to boost the amplitude of the photocurrent above system noise sources to improve detection. The amplification process itself contributes noise, causing output to fluctuate about its mean value, even in the absence of light. Ideally, one would want to have gain in the photodetection process, such that the current created in the photodiode could be increased in magnitude above noise contribution of the amplification electronics. An avalanche photodiode (APD) is a photodiode exhibiting increased responsivity due to internal amplification of the photocurrent through impact-ionization in which "charge carriers," electrons or holes, with sufficient kinetic energy can knock a bound electron out of its bound state in the valence band of a semiconductor and promote it to a state in the conduction band, creating an electron-hole pair. APDs are particularly useful for detecting weak luminous signals because their high responsivity boosts the photocurrent signal relative to noise produced by sources in the detection system downstream of the photodiode. However, the benefit of avalanche multiplication comes at the expense of an increase in "shot noise" by APD excess noise factor which is a measure of gain uncertainty.

Moreover, electric current flows in a photodiode or APD even in the absence of illumination. This "dark current" is a spurious output signal which itself has a temperature dependent increase in shot noise by an excess noise factor, a result of the quantization of the electric current's constituent charge, which causes the output of the APD to fluctuate about its mean value in the absence of light. Since individual charge carriers of either polarity, electrons and holes, are indistinguishable, the current resulting from photon generated electrons or holes, "photocarriers," cannot be distinguished from the current resulting from electrons or holes generated by other processes, such as "dark carriers," and the total current flowing in the APD cannot be segregated into photocurrent and dark current by inspection.

What is desired, therefore, is a method of discriminating photon induced current events and dark current events produced by an APD.

BRIEF DESCRIPTION OF THE DRAWINGS

FIG. 12A is a graphical representation of a pulse probability histogram.

FIG. 12B is a graphical representation of an induced current signal.

FIG. 12C is a graphical representation of a zero-crossing scheme.

DETAILED DESCRIPTION OF PREFERRED EMBODIMENTS

Figures 1, 2:
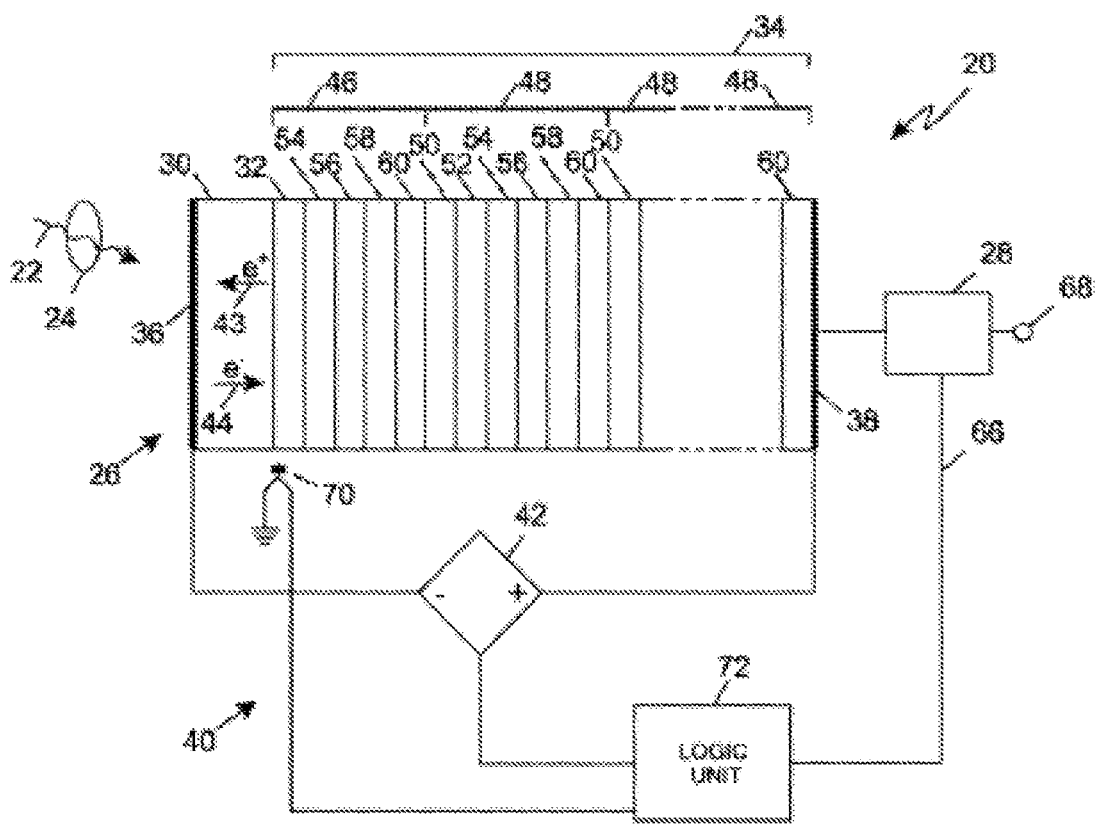
FIG. 1 is a block diagram of an exemplary photoreceiver including an avalanche photodiode (APD).
FIG. 2 is a schematic representation of an exemplary photoreceiver.

Referring in detail to the drawings where similar parts are identified by like reference numerals, and, more particularly to FIGS. 1 and 2, in an exemplary photoreceiver 20, such as is used in a laser range finder or a direct detection laser detection and ranging device (LADAR), incident light, one or more photons 22, impinges on the device's optics 24 and is focused on an avalanche photodiode (APD) 26. In the APD, one or more photons are converted to an electrical signal, a photogenerated current comprising photon induced events or pulses, which is transmitted to a detector decision circuit 28 which detects the electrical signal and, thereby, the interaction of the photon or photons with the APD. The popularity of APDs in high speed photoreceivers is attributable to the APD's high internal optoelectronic gain which enables the photogenerated current to dominate the thermal noise of sources in the photoreceiver circuitry without the need to amplify the incident light. The optoelectronic gain of the APD is the result of a cascade of charge carrier impact ionizations in a strong electric field in an intrinsic multiplication layer of the APD.

The exemplary separate absorption, charge and multiplication avalanche photodiode (SACM APD) 26 comprises generally an absorption region 30, a charge region 32 and a multiplication region 34 (indicated by a bracket) arranged between an anode 36 and a cathode 38 which are interconnected by a biasing circuit 40. The biasing circuit 40 comprises a voltage source 42 which exerts an electrical potential between the anode 36 and the cathode 38 producing an electric field in the APD. The strength of the electric field can be varied by adjusting the magnitude of the electrical potential, the bias, exerted by the biasing circuit 40. Current does not flow freely between the anode and the cathode because a positive voltage is applied to the cathode and a negative voltage is applied to the anode so the diode junction is reverse biased by the resulting electric field.

A photon 22, entering the absorption region 30 of the APD 26, generates an electron-hole pair comprising a positively charged hole 43 which under the influence of the electric field drifts toward the anode 36 and a photoelectron 44 which drifts toward the cathode 38 into the charge region 36 and then into the multiplication region 34 of the APD. Preferably, the multiplication region 34 of the APD comprises plural discrete heterostructured gain stages 46, 48 (indicated by brackets) each comprising an ordered sequence of layers preferably including a first field up layer 50, a first intrinsic layer 52, a second field up layer 54, a second intrinsic layer or ionization layer 56, a field down layer 58 and a relaxation layer 60. The charge region 32 functions as the first field up layer and the first intrinsic layer of the gain stage 46 nearest the anode. U.S. Pat. No. 7,432,537, incorporated herein by reference, discloses in detail the construction and linear mode operation of an exemplary SACM APD with multiple heterostructured gain stages.

Figure 3:
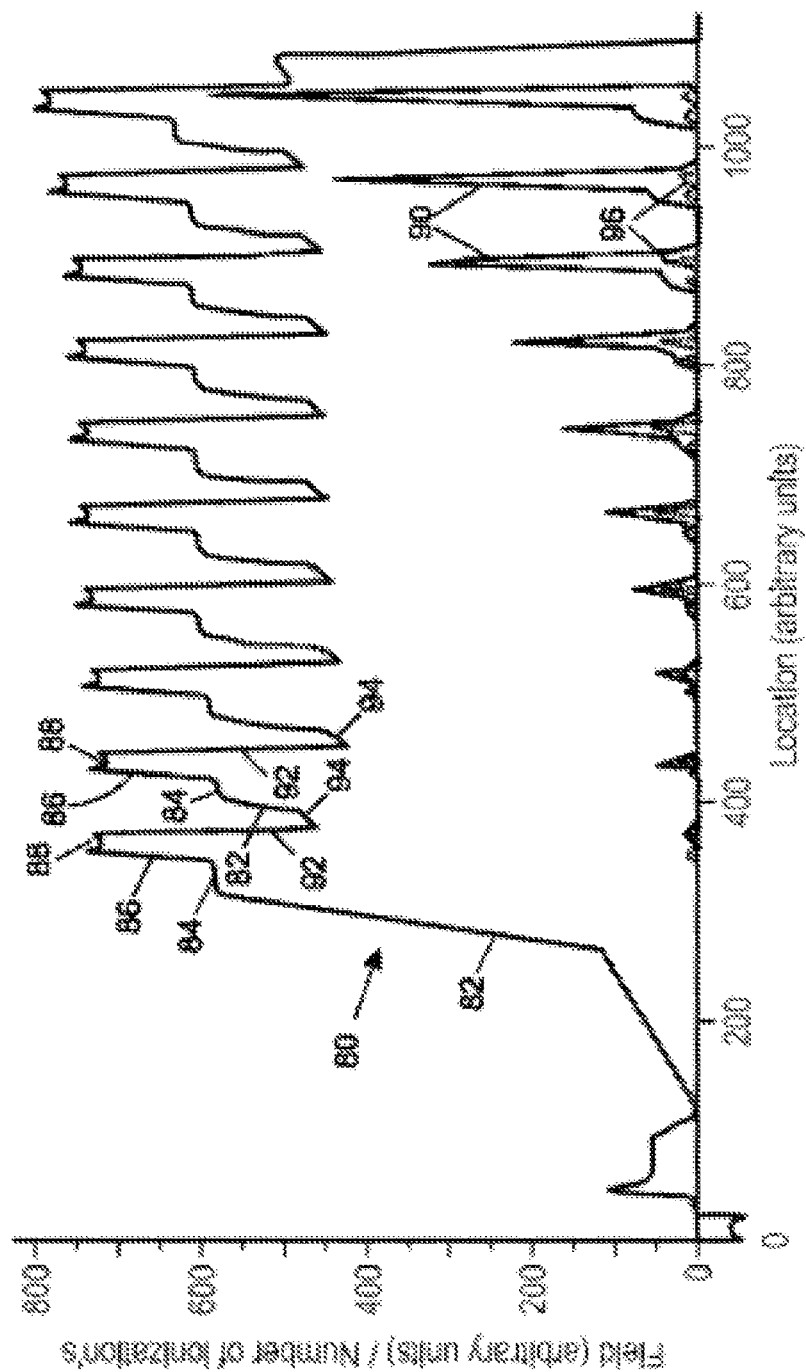
FIG. 3 is an illustration of electric field strength and the locations of electron and hole initiated impact ionization of a 10-stage, separate absorption, charge and multiplication avalanche photodiode (SCAM APD).

In an APD having separate absorption and multiplication regions, avalanche multiplication of photocurrent is initiated by the carrier type that drifts from the absorption region to the multiplication region and in the reverse biased exemplary SACM APD 26, the absorption and multiplication regions are ordered such that photoelectrons are injected into the multiplication region from the absorption region. Referring also to FIG. 3, when an electron 44 drifts into the multiplication region 34 from the absorption region 36, it accelerates in a strengthening portion 82 of the electrical field 80 of a first portion of the charge region 36 in the case of the first gain stage 46 or the first field up layer 50 of subsequent gain stages 48. The electron continues to drift through the charge region toward the cathode and into a second portion of the charge region where the electric field is not increased 84. Similarly, in subsequent gain stages 48, the electron drifts out of the first field up layer 50 into the first intrinsic layer 52 where the electric field remains constant 84 and the electron can lose energy due to collisions in the undoped layer. The electric field is again increased 86 in a second field up layer 54 accelerating the electron above the saturation velocity so that when electrons enter the second intrinsic or ionization layer 56 a portion of the electrons has sufficient kinetic energy to impact ionize. The strength of the electric field is maximized 88 in the ionization layer and the material of the ionization layer is selected to have a lower band gap and, consequently, a lower ionization threshold than the material of the other layers of the multiplication region. A portion of the charge carrier population accumulates enough kinetic energy between scattering events to induce creation of new electron-hole pairs 90 pushing an electron from the valence band into the conduction band while leaving a hole behind.

Electrons pass from the ionization layer to a field down layer 58 where the electric field strength is rapidly reduced 92 below the level required to sustain impact ionization. From the field down layer, the electrons drift to a relaxation layer 60 where a weak field 94 is maintained and the energy of the electrons is reduced by normal scattering so that the electrons arrive at the first field up layer 50 of the next gain stage 48 with relatively uniform, lower energy. As the electrons 44 drift toward the cathode 38 the impact ionization process is repeated in each gain stage 48 and the number of electrons increases substantially linearly 90 in an APD biased below the breakdown voltage so as to operate in the linear mode. During the time of the transport of the initial photoelectron and its progeny through the APD junction, assuming single carrier ionization, the optoelectronic gain for the APD is the gain for each gain stage raised to a power equal to the number of stages. For example, for an APD with stage gain of m=1.8, a five stage cascaded multiplication region can achieve a device gain of M=18.9 ($1.8^6$) multiplication region can achieve a device gain M=357 ($1.8^{10}$), and a ten stage cascaded.

On the other hand, the ionization layer 56 is sized so that secondary holes 96 created in the ionization layer by impact ionization cannot gain sufficient energy to cause further ionization before they drift out of the high-field region and while a hole 96 created by impact ionization in the ionization layer 56 will tend to accelerate toward the anode 36 it will pass out of the ionization layer to the second field up layer 54 on the anode side of the ionization layer before sufficient energy is gathered to cause further ionization. Although the hole may continue to accelerate, the reduced strength of the electric field and the greater bandgap of the material making up the second field up layer reduce the probability that the hole will ionize. When the hole passes into the first intrinsic layer 52 it will lose energy due to collisions so that when the hole enters the ionization layer of the next gain stage it will have too little energy to impact ionize. As illustrated in FIG. 3, the number of electron-initiated ionization events 90 grows with each gain stage 48 as the initial photoelectron 44 passes through the multiplication region 34 and creates more progeny electron-hole pairs, but the probability of hole-initiated ionization is minimal. In this fashion, the portion of the APD's responsivity related to electron-initiated ionization events is enhanced while that of holes is suppressed and feedback is minimized.

The exemplary photoreceiver 20 includes a decision circuit 28. The exemplary decision circuit 28 comprises a transimpedance amplifier 62 which converts the current output by the APD 26 to a voltage and a threshold comparator 64 which outputs 68 a "count" when the input voltage from the transimpedance amplifier exceeds a threshold voltage 66. On other hand, a decision circuit of photoreceiver might comprise a transimpedance amplifier having an output current and a threshold comparator comparing the output of the transimpedance amplifier to a threshold current. The transimpedance amplifier is by nature noisy and by setting the threshold voltage high enough to account for an estimate the amplifiers noise, the output of the decision circuit reflects the output of the APD. However, the output of the APD comprises both photocurrent, arising from the interaction of light with the APD, and dark current comprising dark counts or events arising within the APD even in the absence of the APD's exposure to light. Since photo generated charge carriers, "photocarriers," of either polarity, electrons and holes, are indistinguishable from "dark carriers," electrons or holes generated by other processes, the total current flowing from the APD cannot be segregated into photocurrent and dark current.

A dark count is an avalanche event which is not induced by a carrier generated by a photon and an electric current known as "dark current" flows in an APD even in the absence of illumination. The APD 26 is represented schematically as a diode 26' and, in parallel with the diode, a dark current generator 26" which is the source of dark events or pulses. In SACM APDs, non-photon generated dark counts or events arise from the injection of charge carriers into the semiconductor junction, primarily as a result of thermal excitation, tunneling across the semiconductor's bandgap, possibly mediating mid-gap states. Thermal excitation can provide a source of dark current by causing charge carriers to transfer from the valence band to the conduction band, either directly or by way of a midgap defect. In addition, the strong electric field required to drive impact-ionization can also cause electrons to quantum tunnel through the potential energy barrier separating the valence band and the vacant conduction band states in the narrow bandgap semiconductor alloys used in the ionization layers of the gain stages. Tunnel leakage in the multiplication region of an APD can be the dominant source of dark events and this is particularly true of APDs which are cooled during operation and APDs, such as SACM APDs, which are designed for low excess noise, a statistical noise inherent in the multiplication process. Chemical impurities and lattice defects in the multiplier also create mid-bandgap trap states which reduce the effective energy barrier to quantum tunneling. The mid-bandgap trap states divide the dark current generation process into sequential steps each requiring penetration of lower potential energy barrier than the full bandgap of the semiconductor material. The trap assisted tunneling process is relatively insensitive to device temperature because carrier generation is via quantum tunneling through the potential energy barrier rather than thermal promotion of carriers over the barrier. In addition, impurities and crystal defects can result in charge traps and the high current in the junction results in a probability that the charge traps will be filled with a carrier which is released later initiating a second pulse or "after pulse." Many types of APDs, including APDs manufactured from InP, InGaAs and $In_{0.5}2Al_{0.4}sAs$, exhibit a dark current generation rate at high bias which scales linearly with trap concentration in the multiplier, exponentially with the applied reverse bias and which has a weaker exponential dependence upon temperature.

While both photocarriers and dark carriers are subject to avalanche multiplication, the respective types of carriers are generated by different mechanisms and, as result, exhibit differing pulse height distributions, that is, the variation of the magnitude of the output pulses at a constant applied voltage. While the portions of the total output current of the APD attributable respectively to photon induced events and dark events cannot be determined, the inventors concluded that the differences in pulse height distribution for dark current and photocurrent could be exploited to statistically distinguish between photon induced pulses and dark pulses, that is, pulses not induced by interaction of a photon with the APD.

All primary photocarriers, photoelectrons 44 in the exemplary photoreceiver 20, are generated in the absorption region 30 and are injected into multiplication region 34 at one end of the multiplication region and pass through the multiplication region on the maximum possible path length. When a secondary electron-hole pair is generated in one of the ionization layers of the multiplication region, the electron travels toward the cathode and the hole travels toward the anode but neither secondary carrier, hole nor electron, traverses the maximum path length through the multiplication region. A population of dark current carriers is generated within the absorption region 30 and, like the photoelectrons 44 pass through the multiplication region 34 on the maximum possible path length. Another population of dark current carriers are generated within the multiplication region and, like the secondary carriers, the path through the multiplication region 34 traversed by a dark carrier, either a dark electron or a dark hole, will depend on where the dark carrier originated. Since gain occurs in the spatially discrete gain stages of the multiplication region, the contribution of each dark carrier to the dark count or current will depend on where the dark carrier arose. For example, in the simplified case of single carrier ionization, in a 10 stage APD with a gain 1.8 per stage, one tenth of the dark carriers can be expected to arise in the tenth stage and experience no gain. A second tenth of the dark carriers can be expected to arise in the ninth, the second to last, stage and experience a gain of 1.8 and so forth. Since generation of dark carriers by tunneling will be localized in the respective multiplication layers 56 where the electric field is strongest and the band gap the narrowest and will have too little energy to impact ionize in the gain stage in which they are generated, a primary dark electron generated in the ith stage of the multiplication region will experience an average gain of approximately:

$$M_i = m^{i-1} \quad (1)$$

where:
$M_i$=average gain of a carrier at the i'th gain stage and
$m_j$=effective average gain of the of the jth multiplication stage.

The average gain ($M_i$) is an approximation because equation (1) does not account for the counter propagating holes which are generated with the electrons and which have a finite chance of triggering impact ionization in the earlier gain stages of the multiplication region.

Assuming a uniform probability of primary dark carrier generation in each stage, in the case of largely single carrier ionization, the pulse height distribution of the dark current from all stages of the multiplication region is approximated by the weighted average of the pulse height distributions of dark electrons generated in each stage:

$$PHD_{dark} = \frac{1}{j} \sum_j PHD(i) \quad (2)$$

where:
$PHD_{dark}$=pulse height distribution of all stages, and
PHD(i)=normalized pulse height distribution for primary carrier generation in the $i^{th}$ stage.

The pulse height distribution for each gain stage can be approximated by the McIntyre distribution:

$$P_m(i) \approx \frac{a * \Gamma\left(\frac{n}{1-k}+1\right)}{n \times (n-a)! \times \Gamma\left(\frac{k \times n}{1-k}+1+a\right)} \times \quad (3)$$

-continued $$\left(\frac{1+k(M_i-1)}{M_i}\right)^{a\times\frac{k\times n}{1-k}} \times \left(\frac{1-k(M_i-1)}{M_i}\right)^{n-a}$$

where:

α is the number of primary dark electrons, n≥α is the output level for which a probability is to be calculated, k is the hole to electron ratio for impact ionization, and the Euler gamma function is defined as $$\Gamma(z) = \int_0^\infty dt\, t^{z-1}\exp(-t)$$

While equation (3) does not account for hole feedback into earlier stages of the multiplication region and the resulting probability of hole initiated impact ionization in earlier gain stages, k is small for an SACM APD and the approximation is reasonable.

Figure 4:
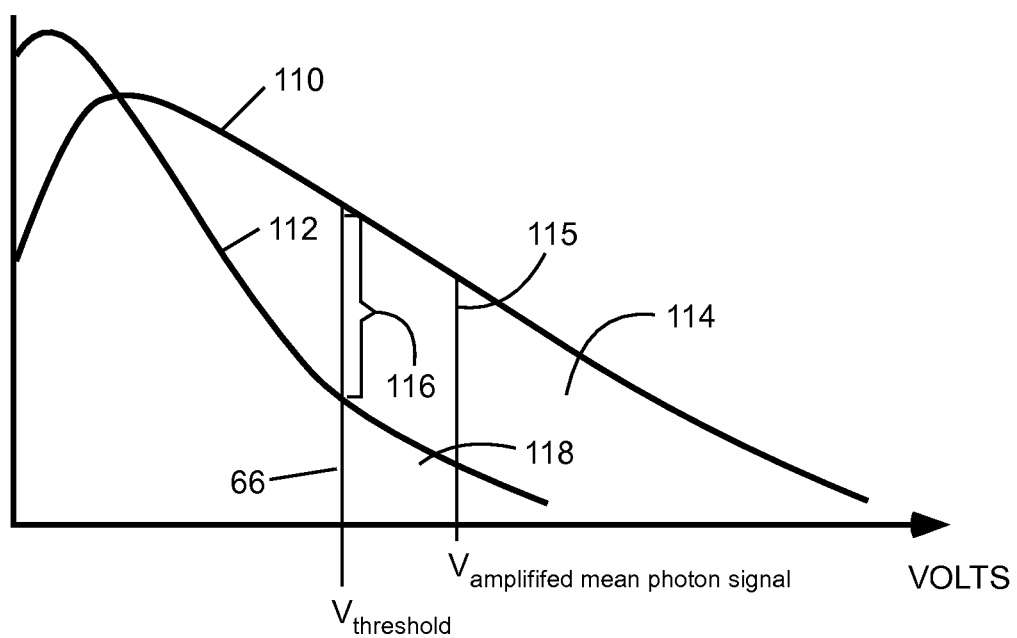
FIG. 4 is a graphical representation of the respective pulse height distributions of photocurrent and dark current output by an exemplary separate absorption, charge and multiplication avalanche photodiode.

Referring also to FIG. 4, since primary photocarriers are generated by interaction between photons 22 and the material of the absorption region 30 of the APD and are injected into the multiplication region 34 to traverse the maximum path length in the APD, the pulse height distribution of the photon induced pulses or events 110 is different than the pulse height distribution of dark carrier pulses or events 112 which are not initiated by photon interaction with the APD but which arise by way of thermal and tunneling events distributed throughout the spatially separated ionization layers 56. The inventors reasoned that the number of correctly detected photon induced events 114 could be maximized while the number of dark current generated false alarms, "false counts" 118, arising from incorrectly discriminated dark events could be minimized by setting the decision circuit's threshold voltage 66 to the voltage maximizing the difference 116 (indicated by a bracket) between the pulse height distribution for dark current 112 and the pulse distribution for photocurrent 110. Similarly, the number of correctly detected pulse events could be maximized if a central tendency, for example, the mean voltage of a plurality of pulses 115 or a current, exceeded the threshold 66. Since dark carrier generation and dark carrier pulse height distribution varies with temperature and the bias of the APD, the exemplary photoreceiver 20 includes a temperature sensing element 70, for example a thermocouple, communicatively connected to a logic unit 72, such as a data processing unit operating according program instructions, to vary the threshold voltage 66 of the decision circuit 68. Likewise, the pulse height distributions of the photocurrent 110 and the dark current 112 vary with the bias applied to the APD and the logic unit 72 is connected to the variable voltage source 42 of the bias circuit 40 to control the bias voltage and to adjust the threshold voltage 66 to maximize the difference between the photocurrent and dark current pulse height distributions in response to a change in the bias voltage.

A false count rate (FCR) for a photoreceiver can be modeled as a sum of the electronic noise count rate originating solely from circuit noise in the transimpedance amplifier connected to the APD and a dark count rate determined by convolution of the transimpedance amplifier noise with the amplified dark current in the output of the APD:

$$FCR = ENC + DCR \tag{4}$$

where:

FCR is the false count rate,

ENC is the electronic noise count of the amplifier, and

DCR is the dark current count rate.

And, the electronic noise count of the amplifier is:

$$ENC = rate \times \int_{n=threshold}^{\infty} PHD_{TIA}(n)dn$$

where:

rate is the minimum separation between consecutive pulses that can be resolved and counted separately, and PHD is the pulse height distribution of the transimpedance amplifier which is often modeled as a Gaussian distribution centered at n=O. The dark count rate (DCR) from the APD dark current is determined in a similar manner where the amplitude distribution of darks counts from the APD is determined by deconvolving the amplifiers noise with the mean pulse height distribution of the APD's dark generated carriers as might be determined in equation (2):

$$PHD = PHD_{TIA} * PHD_{APD} \tag{6}$$

Figure 5:
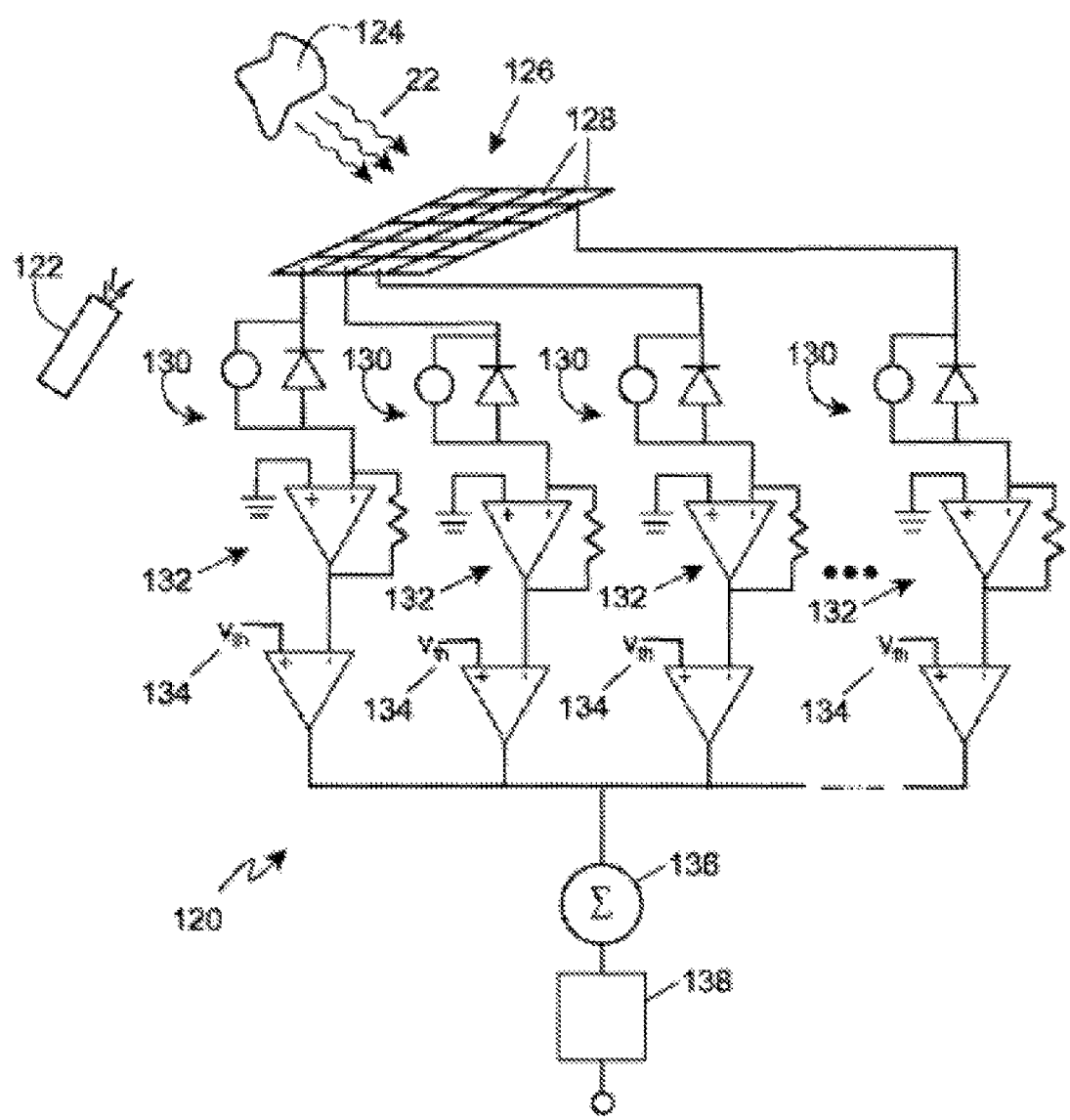
FIG. 5 is a block diagram of a laser detection and ranging device (LADAR).

Referring also to FIG. 5, a laser detection system 120 includes a laser 122 arranged to illuminate a surface 124 to be ranged with a pulse of light. Photons 22 reflected from the surface are detected by a photoreceiver and analyzed to determine the distance from and/or speed of the surface 124 relative to the photoreceiver. The inventors concluded that the accuracy of the laser detection system could be improved if the threshold voltage of the system's detector maximized the difference between the pulse height distribution of photocurrent events and dark current events. In the laser ranging system 120, the laser 122 transmits pulses of light which are reflected from the surface 124 to a detection surface 126. The area of the detection surface 126 is divided into a plurality of subareas 128 each of which focuses one or more photons 22 on a respective one of a plurality of photoreceivers 130. In one embodiment, the plurality of photoreceivers are smaller than the diffraction limited resolution limit of the optical system, such that signals are spread over multiple of the plurality of the photoreceivers 130. For instance the airy disk can overlap 2, 3, 4 or more of the plurality of photoreceivers 130. The photo receivers include respective decision circuits 132 each having a threshold voltage 134 which maximizes the difference between the pulse height distributions of the photocurrent and the dark current of the photoreceiver. Electrical events detected by the plural photoreceivers are summed 136 and output to a second decision circuit 138 which detects the sum of outputs exceeding a threshold. In another embodiment the binary output or amplitude of the signals are summed and output. Since dark current events occurring in the respective receivers are not time correlated and photocurrent events arising from the interaction of coherent photons of the reflected light pulse with the ones of the plural receivers are time correlated, summed events exceeding a threshold in the second decision circuit are more likely correctly detected photocurrent events and less likely false alarms.

Figure 6:
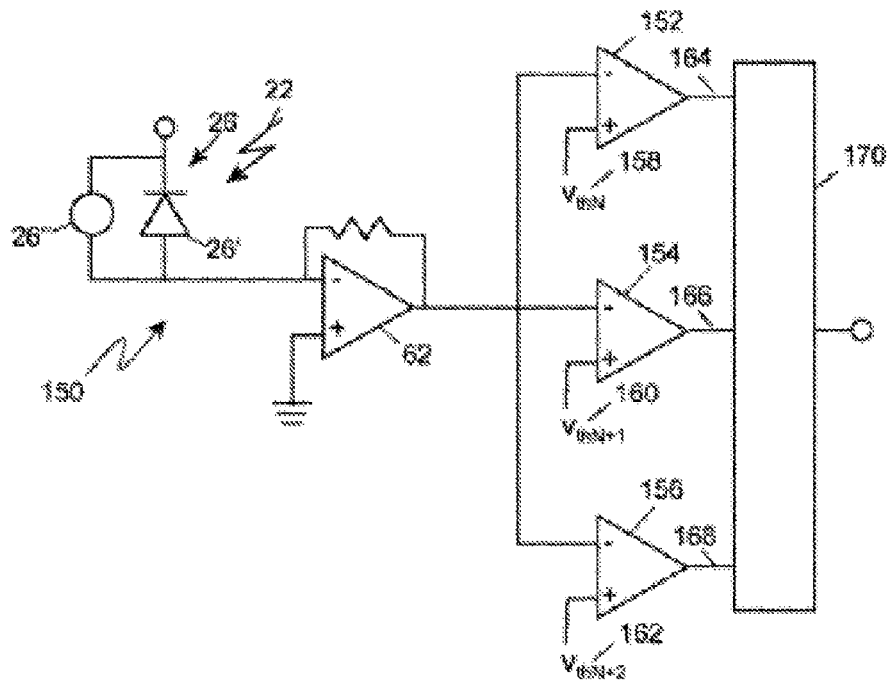
FIG. 6 is a schematic representation of a photodiode including plural threshold comparators and a secondary decision circuit.
Figure 7:
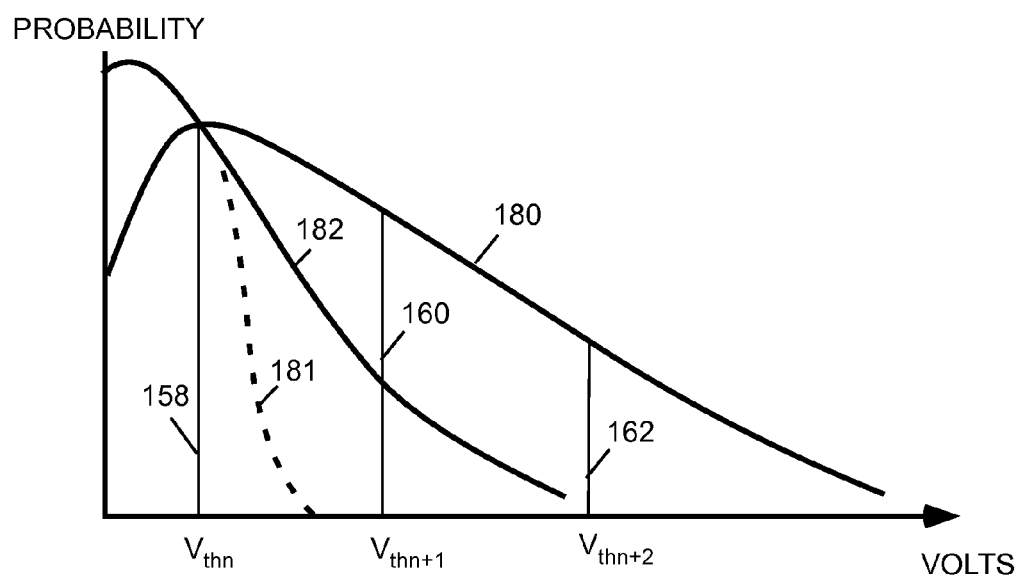
FIG. 7 is a graphical representation of plural threshold voltages and respective pulse height distributions of photocurrent and dark current output by a separate absorption, charge and multiplication avalanche photodiode.

Referring also to FIGS. 6 and 7, another embodiment of a photoreceiver 150 comprises a photodiode 26 and a transimpedance amplifier 62 to convert the current output by the photodiode to a voltage. The output of the transimpedance amplifier is transmitted to plural threshold comparators 152, 154, 156 each biased to a different threshold voltage; $V_{thn}$ 158, $V_{thn+1}$ 160, $V_{thn+2}$ 162. Each of the threshold voltages, $V_{thn}$ 158, $V_{thn+1}$ 160, $V_{thn+2}$ 162, corresponds to a pair of photocurrent and dark current probability values where the respective threshold voltage intersects the photocurrent pulse height distribution 180 and the dark current pulse height distribution 182. The probability of detecting the events is given by the area under the curve for all threshold values below the setting, see an inverse cumulative probability distribution function, FIG. 13A, and related discussion further hereinbelow. Preferably, one of the threshold voltages 158 is selected to minimize the difference between dark pulse height distribution 182 and the photocurrent pulse height distribution 180, a second threshold voltage 160 is selected to maximize the difference between the dark pulse height distribution and the photocurrent pulse height distribution and a third threshold voltage 162 is a voltage exceeding the maximum voltage of dark pulses. The outputs of the threshold comparators 164, 162, 168 are input to a secondary decision circuit 170 which applies a second decision criterion, for example, designating a pulse having a value exceeding a central tendency, such an average or mean, of said three thresholds as a photon induced pulse. In general the dark pulse height is a summation of the thermal amplifier noise and the photodiode noise. Here the thermal amplifier noise contribution 181 provides a practical limit, where signal averaging must be implemented in order to better discriminate between photon induced pulses and dark induced pulses.

Unlike photocarriers, dark carriers do not experience gain in all of the gain stages of the multiplication region and, therefore, the average gain of dark carriers is different than that of photocarriers. Since the pulse height distributions comprise, respectively, the probabilistic occurrence of the amplitudes of the photocurrent count events and the probabilistic occurrence of the amplitudes of the dark count events, the pulse height distribution of the photocurrent will be different than the pulse height distribution of the dark current and the difference can be used to statistically discriminate between photon induced events and dark events.

Figure 8:
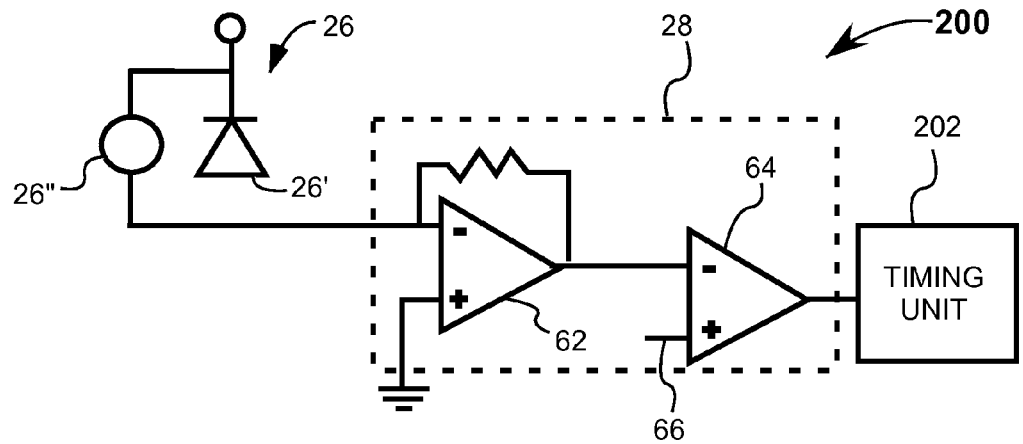
FIG. 8 is a schematic representation of an exemplary photoreceiver similar to that seen in FIG. 1, further including a timing unit.

Referring to FIG. 8 describing another embodiment of the present disclosure, a photoreceiver 200 has the photodiode 28 and the decision circuit 28 as that shown in FIG. 2, further comprising a timing unit 202. The timing unit 202 provides temporal reference of said photon induced pulses emitted by the photodiode 28 upon. The timing unit can implement a time-to-digital converter (TDC) or a time-amplitude converter (TAC) and combinations thereof. The temporal reference can be used to measure the time interval between a plurality of events. In aforementioned applications, laser rangefinding (LRF), LADAR, use the plurality of events to determine the distances to an object. In much the same ware the receiver can be used to detect target information recorded in the laser pulse in a LADAR system, in another application, optical communications, information is transmitted in optical signals recorded in a time relative to one another in a temporal reference frame. The photoreceiver can be used to discriminate dark events from photon events in a communications data stream. Also, the embodiments herein can be used for general digital low light level imaging, wherein the APDs are used to detect single, or low photon count signals, and the images are built up by the photon counts in each pixel.

The timing unit can provide for time-of-flight and amplitude information for a series of photon induced pulses. For instance a first optical pulse can be emitted and return pulses detected and indexed temporally according to their TOA. Subsequent optical pulses can be detected, time stamped and the TOF can be calculated and recorded. The time stamps can be accumulated in a time-of-arrival histogram or their arrival time can otherwise be correlated with varying levels of temporal accuracy. In this way the timing information from correlated photon induced pulses can be discriminated from the uncorrelated dark induced pulses or false alarm events. Further, processing of the events can be used to increase the uncertainty of the time-of-arrival and amplitude of the signal.

Alternatively, recording both the TOA and amplitude of multiple pulse echoes it is possible to create a histogram of the signal events, or otherwise correlate the recorded pulse events with respect to time and use both the temporal correlation and the pulse amplitude information to discriminate photon induced pulses from dark induced pulses. Using statistical analyses and signal processing, with knowledge of the pulse height distribution of the photon and dark pulse events it is possible to discriminate photon induced signals from dark induced signals and further possible to determine the TOA and pulse amplitude magnitude with greater accuracy.

Figure 9:
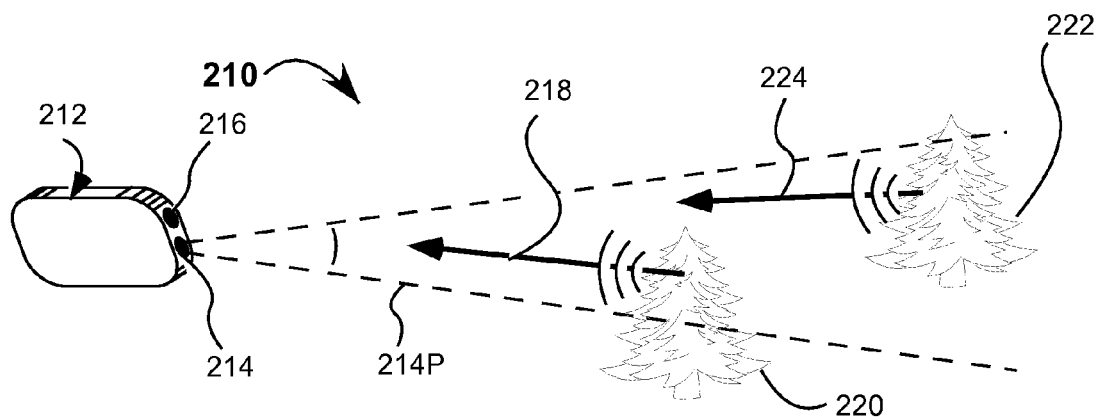
FIG. 9 is an illustration of the exemplary photoreceiver shown in a LRF or LADAR application.
Figure 10:
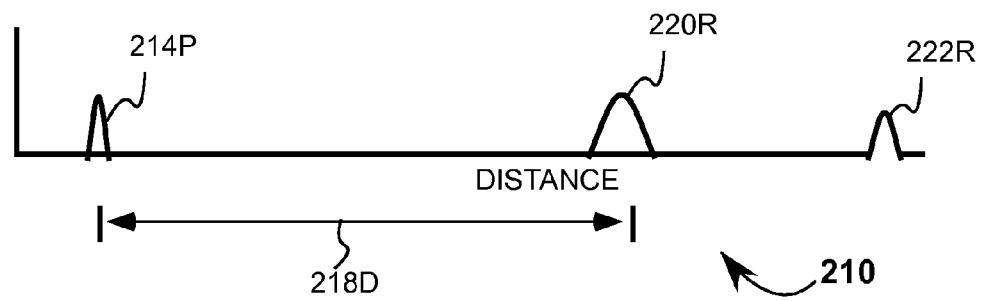
FIG. 10 is a graphical representation of an optical pulse emission and return pulses.

Referring to FIGS. 9 and 10, a LRF or LADAR application 210, a photoreceiver 212 has an optical source 214, such as a laser, and a photoreceiver 216. An optical pulse emission 214P from the optical source 214 is one reference, and receipt of a first echo 218 by the photodiode 216 from a first target 220, here a tree, generates a first return pulse 220R. If multiple objects are illuminated, and multiple returns detected, the distance to each can be determined. Here the pulse emission 214P from the source 214 is divergent and another target is in the path. A second target 222, also a tree, provides a second return pulse 222R. The distance (D) to the first target is given by $D=(c \times t)/2$, where D is distance, c is the speed of light, and t is time between the optical pulse emission 214P and the receipt of the first echo 218. In laser ranging applications the range of each target and the distances between each target can be resolved, in LADAR application multiple angle-angle-range measurements in a scene can be resolved. The photoreceiver can detect and capture the time of arrival (TOA), pulse amplitude, or both, of a portion of the optically induced pulse, including the leading edge of the return pulse, the peak of the return pulse, or the last return, and combinations thereof. The photoreceiver can also capture the timing of the leading and edges of each pulse return. The photoreceiver can capture an analog or digital value signal representative of the entire of the laser pulse echo. During the time of flight of the laser pulse, to and from the reflecting target, there is also some probability of detecting a dark event occurring. The interval of time in consideration can be shortened so that it includes return pulses within a certain time window, corresponding to echoes created from objects at a particular distances, and the time window can be shortened to reduce the number of echoed pulse returns, reduce the probability of recording a dark event, or from detecting the outgoing laser pulse. The inventors concluded that by setting the threshold value where it maximizes the difference between the pulse height distributions of the photo-induced signal and the dark current induced signal of the photoreceiver, the area under the receiver operating characteristic (ROC) curve is maximized.

Figure 11A:
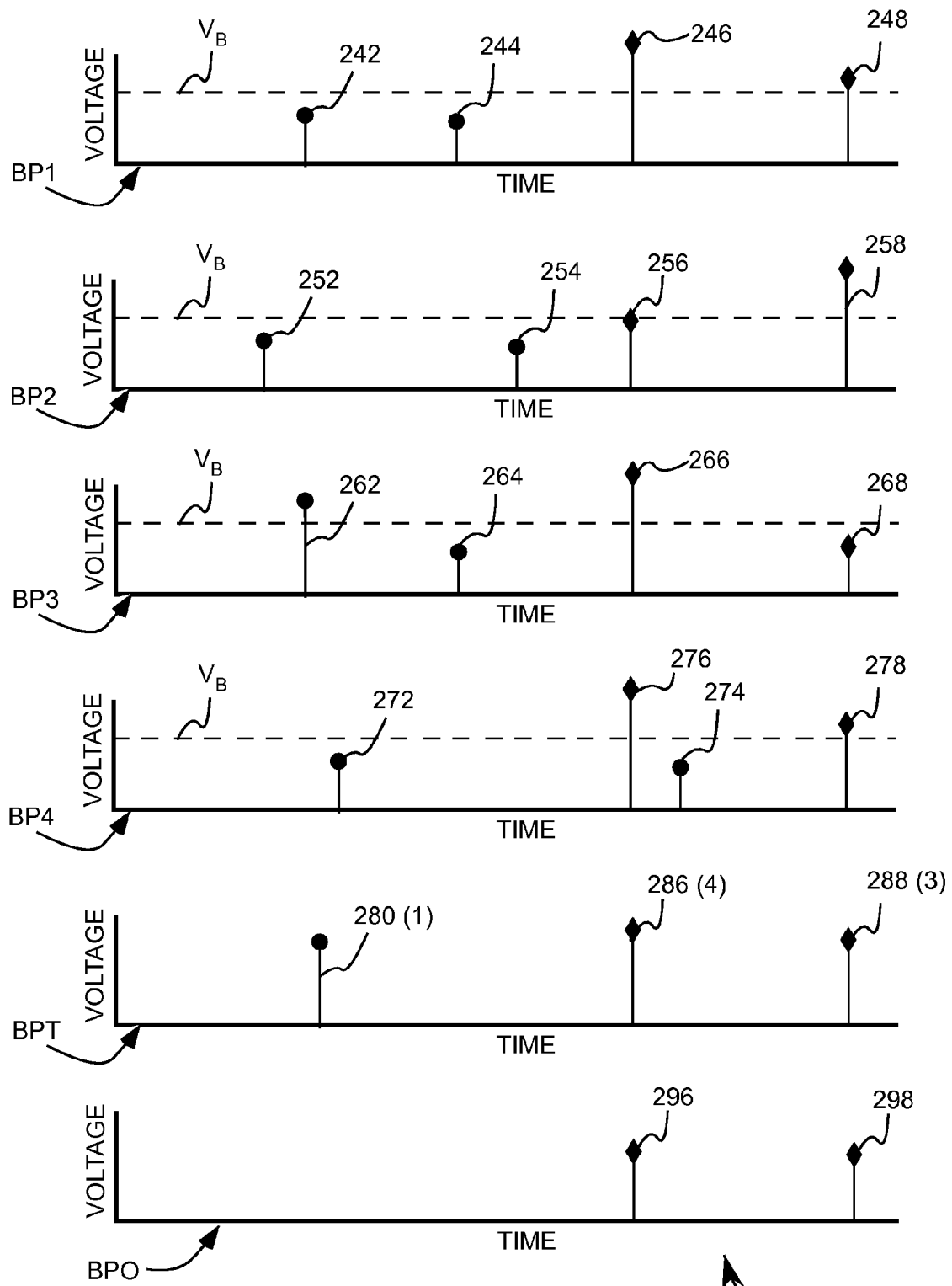
FIG. 11A is a graphical representation of a binary pulse accumulation scheme.

Referring to FIG. 11A, a binary accumulation scheme 240 is provided in a LRF or LADAR application. In this binary accumulation scheme, events or pulses generated are counted when above the voltage threshold. Multiple optical pulses are emitted by an optical source in order to aggregate return echoes, and the resulting photodiode pulses. Photodiode pulses are aggregated when above the voltage threshold and indexed according to their respective time-of-arrival (TOA) or distance. Photodiode output pulses are segregated in time from a first pulse BP1, a second pulse BP2, a third pulse BP3, and a fourth pulse BP4. A pulse sum BPT of the detected pulses provides the accumulated pulses and a binary outcome BPO provides the resultant pulses distinguished in the process. A voltage threshold $V_B$ is common to the pulses BP1, BP2, BP3, and BP4. Pulses resulting from an optical event are illustrated with diamond tipped markers whereas pulses from dark current events are illustrated with dot tipped markers.

In the first pulse BP1, a dark pulse 242 and a dark pulse 244 are generated, both below the voltage threshold $V_B$. An optical pulse 246 and an optical pulse 248 are generated, both above the threshold and therefore each counted, or accumulated, indexed by their TOA. In the second pulse BP2 a dark pulse 252 and a dark pulse 254 are generated, both below the voltage threshold $V_B$ and not corresponding with the previous dark pulses. An optical pulse 256 and an optical pulse 258 are generated, above the threshold voltage $V_B$ and correspond to the two previous detected optical pulses. In the third pulse BP3, a dark pulse 262 and a dark pulse 264 are generated. Dark pulse 262 is above the voltage threshold $V_B$, and therefore accumulated and indexed. Dark pulse 264 is below the voltage threshold. An optical pulse 266 is above the threshold and indexed, whereas an optical pulse 268 is below the threshold, effectively no detected. In the fourth pulse BP4 a dark pulse 272 and a dark pulse 276 are both below the threshold. An optical pulse 276 and 278 are both above the threshold and indexed. The pulse sum BPT provides the total temporally indexed pulses. A pulse accumulation 280 corresponds with the dark pulse 262 has a single occurrence within the four pulses. A second pulse accumulation 286 corresponds with optical pulses 246, 256, 266, and 276 having four occurrences within the four pulses. A third pulse accumulation 288 corresponds with optical pulses 248, 258, and 278. Accumulation pulses 280, 286, and 288 have a normalized binary accumulation of 0.25, 1, and 0.75. Here, a normalized binary accumulation threshold of 0.5 eliminates the optical pulse optical pulse 280 and the resultant binary accumulation output BPO has a binary optical pulse 296 corresponding with optical pulses 246, 256, 266, and 276, and a binary optical pulse 298 corresponding with optical pulses 248, 258, 268, and 278. In addition to increasing discrimination between optical and dark pulses, distribution of grouped binary pulses can be used to approximate pulse shape, return waveform and increase accuracy in TOF measurements.

Figure 11B:
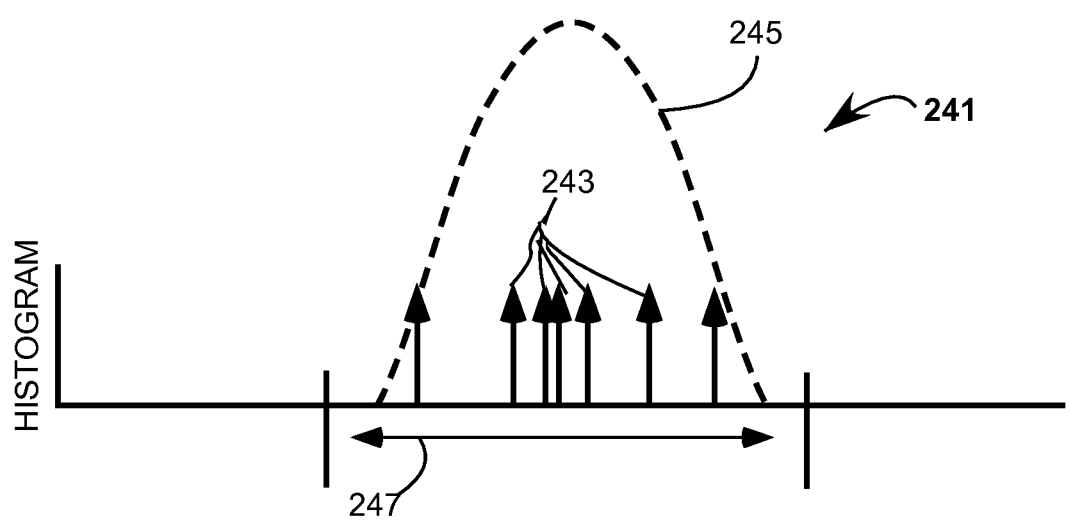
FIG. 11B is a graphical representation of a binary accumulation histogram of a return pulse

Referring to FIG. 11B, a binary accumulation histogram 241 provides a temporal indexing of photon induced pulses 243 from a laser ranging application. Here the distribution of the binary return pulses can be used to determine an approximate pulse shape 245 of the return pulse, wherein each of the photon induced pulses 243 are detected at low-light levels, i.e. single photon detection. In this example the pulse shape is approximated by weighing the temporal relation of each of the photon induced pulses, assuming an equal amplitude. The temporal aggregation of the binary pulses provide an approximately gaussian return pulse. In practice, the calculation of the return pulse would depend on the emission pulse of the optical source used, which in turn would inform the extent of an temporal window 247. For instance, the temporal window for the pulse shape detection may be on the order of a few nanoseconds. Longer more complex waveforms can also be approximated. For instance when emissions reflect and backscatter through foliage such as trees, or other semi-transparent matter which have multiple reflecting surfaces, the waveform will be a continuous train with varying amplitude. Again, the single photon binary distribution can be used to approximate the complex waveform shape.

Referring to FIG. 12A a pulse probability histogram 300A. The histogram 300 illustrates a preferred carrier probability curve 302 and a non-preferred carrier probability curve 304. Graphically illustrated and corresponding with the carrier curves are pulses events vs voltage, a graphic illustration of the histogram as a series of pulse events. The preferred carrier curve 304 and the non-preferred carrier curve 302 show the difference in probability of inducing a peak voltage. A preferred carrier induced pulse curve 302 has a lower probability of inducing a pulse with low voltage than a non-preferred carrier curve 304. The preferred carrier induce pulse curve 302 shows a higher probability of inducing a high voltage pulse than the non-preferred carrier curve 304. As described above, the voltage threshold at a value to discriminate between preferred and non-preferred carriers, here the voltage threshold $V_T$.

Here a pulse event 310, 312, and 314, are above the voltage threshold $V_T$ with peak voltage increasing respectively. Collection of amplitude information for each pulse allows increased discrimination and accuracy in determining TOF measurements. Additionally information can be used to weight return pulses. For instance pulse event 314, taken alone, is more likely to be induced optical return and not noise. Accumulation of amplitude information allows discrimination based on the accumulated amplitude mode, amplitude mean, or other statistical discriminator. For instance, repeated measurements at a target can be recorded, the amplitude of each added, then divided by the number of measurements taken. Alternatively, each value can be assigned the mean value anticipated by the pulse height distribution before processing. Additionally, pulse shapes can be approximated based on various resolution time bins and amplitude information. To increase accuracy of TOF, the errors in the time measurements introduced by the amplitude of the signal can be reduced with constant-fraction discrimination or zero-crossing schemes in the receiver circuitry. Time-walk can be compensated with a look-up table, which calibrates the timing of the decision circuits over all pulse amplitude, including if necessary, the APD gain setting.

Referring to FIG. 12B, an induced current signal graph 300B shows a current signal 320, 322 and 324 corresponding with the pulse events 310, 312, and 314 respectively. Amplitude information can be collected by implementing peak hold circuitry, integrating the signal, and other such methods. TOF can be determined by rising edge detection or other more accurate techniques. Assuming each pulse event is corresponds with the same TOF, or distance, the rising edge detection can create error based on temporal difference in rising edge discrimination, called time-walk. Here the amplitude and thus difference in rate of the rising edge of the current signal 320, 322, and 324 result in a time-walk error 326. One method of reducing time-walk error is derivative or other operations can be performed in order to increase accuracy.

Referring to FIG. 12C the zero-crossing scheme 300C shows a second order derivative 330 and 334 of the accumulated current signals 320 and 324 respectively (first order derivative of current signals). The accumulated signals coincide at a zero crossing 336. The zero crossing 336 corresponds temporally with the current amplitude peak of each current signal 320, 322, and 324. Since the amplitude of each of the current signals are aligned, the zero crossing provides a more accurate reference between the pulses and reduces error associated with time-walk.

Figure 13A:
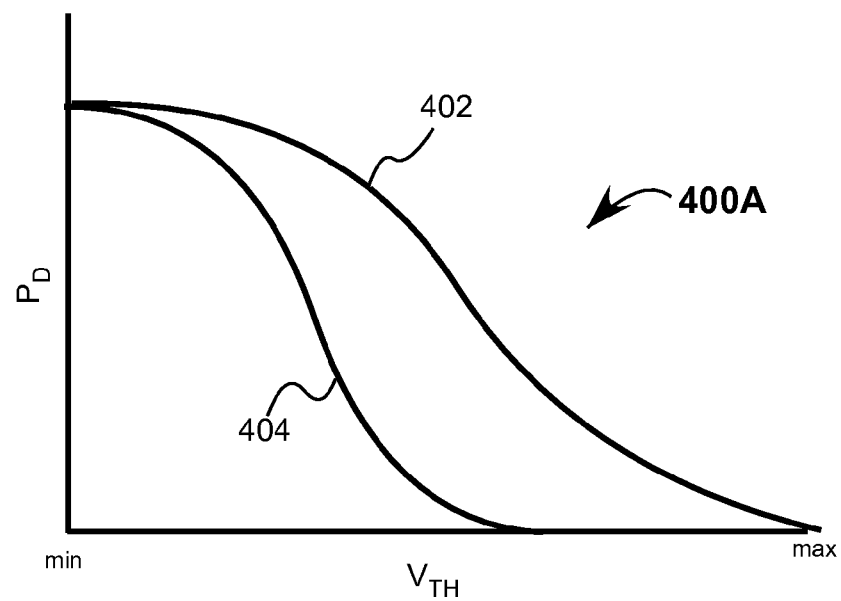
FIG. 13A is a graphical representation of a complementary cumulative distribution function.

Referring to FIG. 13A, a complementary cumulative distribution function (CCDF) 400A displays probability of detection $P_D$ vs threshold voltage at low light levels. An optical induced pulse probability 402 and a dark induced pulse probability 404 are described by: $P_D = 1 - \int_{V_{min}}^{V_{th}} P_V$, where $V_{min}$ is the minimum voltage, $V_{th}$ is the threshold voltage, and $P_V$ is the pulse height distribution curve the pulse height distribution of preferred carriers and non-preferred carriers, respectively. Both the induced pulse probability 402 and the dark induced pulse probability 404 have a high (100%) probability of detection at very low threshold values. As the threshold voltage increases the probability of detection between the optical induced pulse and dark induced pulse separates slowly at first, then more rapidly as the dark pulse detection quickly falls. The dark pulse probability 404 reaches a very low probability ($\approx 0$) before the optical induced pulse probability 402.

Figure 13B:
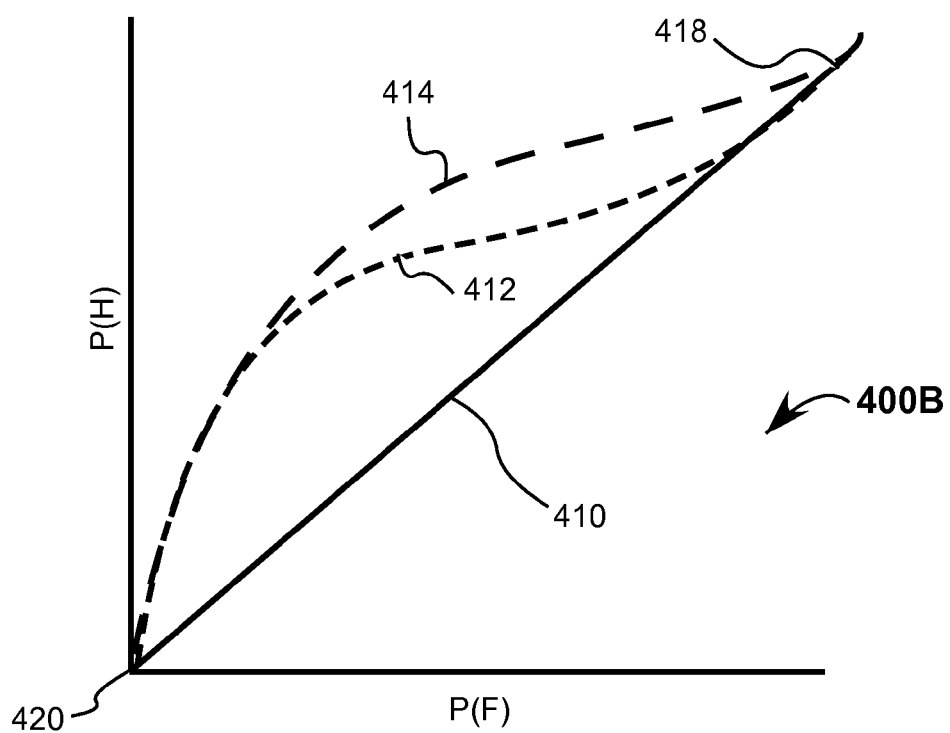
FIG. 13B is a graphical representation of a receiver operating characteristic (ROC) curve of a typical APD compared with APDs of the present disclosure.

Referring to FIG. 13B, a receiver operating characteristic (ROC) graph 400B, for single photon detection, provides the probability of a true positive P(H) vs a false alarm (P(F), or ROC curve, for a typical APD 410, an non-accumulating APD 412 of the present disclosure, and an accumulating APD 412 of the present disclosure. The ROC graph provides a comprehensive description of an APD photoreceiver performance for a given set of conditions, here single photon detection. In general, photoreceivers with a greater area under the curve, have better performance. For reference, the top left starting point of the CCDF curve of FIG. 13 roughly corresponds with an end point 418 of the ROC curve. Similarly the end point of the CCDF roughly corresponds with a start point 420 of the ROC curve.

For the typical APD 410, at single photon detection, the impulse function and probability of detection for optically induced and dark induced pulses is roughly equal, resulting in a linear ROC curve. For the non-accumulating APD 412 and the accumulating APD 414, of the present disclosure, the ROC curve rises rapidly since at higher threshold values, the probability of detecting dark induced pulses is low. The non-accumulating APD 412 and accumulating APD 414 separate, corresponding with lower threshold values. The accumulating APD has better discrimination true positive and false alarms and thus has an increased area under the curve than the non-accumulating APD 412. All the APDs terminate at the end point 418 corresponding with 100% probability of detecting both true positive and false positives. At very low threshold values, the probability of detecting either optical induced pulses or dark induced pulses is very high, since there is no discriminating between the two.

The above describe embodiments can include temperature sensors arranged to sense the temperature of the photodiode. For instance a thermistor can be placed on the photodiode. The device logic can include provide feedback and change operational characteristics based on the photodiode temperature. For instance the threshold can change based on the temperature.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expression that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

We claim:

1. A photoreceiver comprising:
   a. a photodiode arranged to emit an electrical pulse as a result of interaction with a photon and emitting a dark pulse absent interaction with a photon;
   b. a decision circuit to designate a pulse emitted by said photodiode as a photon induced pulse if a measured parameter of said electrical pulse exceeds a threshold value of said measured parameter, said threshold comprising a value of said measured parameter selected to maximize a difference between a pulse height distribution of plural photon induced pulses emitted by said photodiode and a pulse height distribution of plural dark pulses emitted by said photodiode; and
   c. a timing unit to provide a temporal reference of said photon induced pulses emitted by said photodiode.

2. The photoreceiver of claim 1, wherein the timing unit is a time-to-digital converter (TDC) or a time-to-amplitude converter (TAC).

3. The photoreceiver of claim 1, wherein said measured parameter is a voltage.

4. The photoreceiver of claim 1, wherein the temporal reference is emission of photons by an optical source.

5. The photoreceiver of claim 4, wherein the optical source is a laser.

6. The photoreceiver of claim 5, wherein the laser is capable of emitting an optical pulse shorter in duration than the photodiode's impulse response time.

7. The photoreceiver of claim 4, wherein the decision circuit is configured to adjust the threshold based on an emission of the optical source.

8. The photoreceiver of claim 7, wherein the decision circuit is configured to adjust the threshold based on a calibrated emissions pattern transmitted by the optical source.

9. The photoreceiver of claim 1, wherein the decision circuit includes at least one comparator set to trigger on the leading edge of the photon pulse.

10. The photoreceiver of claim 1 further comprising a plurality of comparators, each comparator having a time-of-arrival (TOA) circuit, the plurality of comparators set to trigger on current generated by photon induced pulses, the time difference between the plurality of comparators used to estimate the amplitude of the signal.

11. The photoreceiver of claim 10, wherein at least one of the comparators are set to trigger on the leading edge of the photon induced pulse.

12. The photoreceiver of claim 1, wherein the timing module is configured to record the TOA of multiple pulse events and the photon induced pulses are discriminated from the dark pulses using one or more statistical property of the histogram of the pulses recorded within a time window.

13. The photoreceiver of claim 12, wherein the timing unit discriminates between the photon induced pulses and the dark induced pulses based on the number of pulses occurring within the time window.

14. The photoreceiver of claim 12, wherein the timing unit discriminates between the photon induced pulses and the dark induced pulses based the temporal correlation between the recorded pulses.

15. The photoreceiver of claim 1, further comprising a signal sampling circuit for recording the amplitude of the pulses.

16. The photoreceiver of claim 15, wherein temporal and amplitude information of the pulses is recorded and the photon induced pulses are discriminated from the dark pulses with respect to one or more statistical property of the recorded pulse information.

17. The photoreceiver of claim 15, wherein the decision circuitry is configured to use the pulse amplitude to increase timing accuracy.

18. The photoreceiver of claim 1, further comprising a temperature sensor arranged to sense the temperature of the photodiode.

19. The photoreceiver of claim 18, wherein the threshold is changes based on the temperature.

20. The photoreceiver of claim 18, wherein the decision circuit is configured to adjust the threshold as a function of temporal properties of the pulses.

21. The photoreceiver of claim 18, wherein the decision circuit is configured to adjusts the threshold based on the rate of the incoming pulses.

22. The photoreceiver of claim 1, further comprising a high pass filter, the high pass filter increasing the difference in the distribution of pulses height of the photon induced pulses and the dark induced pulses.

* * * * *